United States Patent
Kapoor et al.

(10) Patent No.: US 10,691,476 B2
(45) Date of Patent: Jun. 23, 2020

(54) PROTECTION OF SENSITIVE DATA

(71) Applicant: McAfee, LLC, Santa Clara, CA (US)

(72) Inventors: Aditya Kapoor, Portland, OR (US); Jonathan L. Edwards, Portland, OR (US)

(73) Assignee: McAfee, LLC, Santa Clara, CA (US)

(*) Notice: Subject to any disclaimer, the term of this patent is extended or adjusted under 35 U.S.C. 154(b) by 177 days.

(21) Appl. No.: 14/752,888

(22) Filed: Jun. 27, 2015

(65) Prior Publication Data
US 2016/0379003 A1    Dec. 29, 2016

(51) Int. Cl.
| | | |
|---|---|---|
| *G06F 21/62* | (2013.01) | |
| *G06Q 20/20* | (2012.01) | |
| *G06F 9/455* | (2018.01) | |
| *G06F 21/53* | (2013.01) | |
| *G06F 21/55* | (2013.01) | |
| *G06Q 20/40* | (2012.01) | |

(52) U.S. Cl.
CPC .......... *G06F 9/45558* (2013.01); *G06F 21/53* (2013.01); *G06F 21/554* (2013.01); *G06Q 20/20* (2013.01); *G06Q 20/206* (2013.01); *G06Q 20/40* (2013.01); *G06Q 20/4016* (2013.01); *G06F 2009/45587* (2013.01)

(58) Field of Classification Search
CPC ............. G06F 21/6218; G06F 9/45558; G06F 2009/45587; G06F 2009/45583; G06F 21/50; G06F 21/53; G06F 21/554; G06F 12/1458; G06Q 20/20; G06Q 20/206; G06Q 20/40; G06Q 20/4016
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,984,592 B1 | 3/2015 | Paczkowski et al. | |
| 9,021,546 B1* | 4/2015 | Banerjee | H04L 63/20 |
| | | | 713/166 |
| 9,614,826 B1* | 4/2017 | McCorkendale | G06F 21/62 |
| 10,181,953 B1* | 1/2019 | Seidenberg | H04L 9/3247 |
| 2005/0283602 A1* | 12/2005 | Vembu | G06F 12/109 |
| | | | 713/150 |

(Continued)

FOREIGN PATENT DOCUMENTS

JP    2014-137821    7/2014

OTHER PUBLICATIONS

Xie, Xiongwei and Wang, Weichao, Rootkit Detection on Virtual Machines through Deep Information Extraction at Hypervisor-level, 2013, IEEE, 4th International Workshop on Security and Privacy in Cloud Computing 2013, pp. 498-503 (Year: 2013).*

(Continued)

*Primary Examiner* — Michael Simitoski
(74) *Attorney, Agent, or Firm* — Patent Capital Group (57) ABSTRACT

Particular embodiments described herein provide for an electronic device that can be configured to monitor access to data in a secured area of memory at a hypervisor level, receive a request from a process to the data in the secured area, and deny the request if the process is not a trusted process. In an example, the electronic device is a point of sale device.

16 Claims, 8 Drawing Sheets

(56) References Cited

U.S. PATENT DOCUMENTS

| | | | |
|---|---|---|---|
| 2007/0061596 A1 | 3/2007 | Ferguson et al. | |
| 2008/0194296 A1* | 8/2008 | Roundtree | G06F 21/62 455/558 |
| 2009/0222816 A1* | 9/2009 | Mansell | G06F 12/145 718/1 |
| 2012/0030731 A1 | 2/2012 | Bhargava et al. | |
| 2012/0047357 A1* | 2/2012 | Bealkowski | G06F 9/5072 713/2 |
| 2012/0149338 A1* | 6/2012 | Roundtree | G06F 21/62 455/411 |
| 2013/0111211 A1* | 5/2013 | Winslow | H04L 9/3234 713/171 |
| 2013/0117563 A1* | 5/2013 | Grabelkovsky | G06F 21/6218 713/165 |
| 2013/0282776 A1* | 10/2013 | Durrant | G06F 9/45533 707/827 |
| 2013/0347131 A1* | 12/2013 | Mooring | G06F 9/45558 726/29 |
| 2014/0053245 A1* | 2/2014 | Tosa | H04L 63/08 726/4 |
| 2014/0351607 A1 | 11/2014 | Moran et al. | |
| 2015/0013008 A1* | 1/2015 | Lukacs | G06F 21/53 726/24 |
| 2015/0058997 A1* | 2/2015 | Lee | G06F 9/45558 726/26 |
| 2015/0106871 A1* | 4/2015 | Lim | G06F 21/51 726/1 |
| 2015/0254145 A1* | 9/2015 | Lachenmann | G06F 12/1491 711/6 |
| 2015/0339475 A1* | 11/2015 | Feroz | G06F 21/566 726/23 |
| 2016/0117498 A1* | 4/2016 | Saxena | G06F 21/445 726/23 |
| 2016/0308951 A1* | 10/2016 | Jiang | H04L 67/08 |
| 2016/0364341 A1* | 12/2016 | Banginwar | G06F 12/145 |
| 2016/0378685 A1* | 12/2016 | Spurlock | G06F 12/145 711/163 |

OTHER PUBLICATIONS

Champagne, David, and Ruby B. Lee. "Scalable architectural support for trusted software." HPCA—16 2010 the Sixteenth International Symposium on High-Performance Computer Architecture. IEEE, 2010. (Year: 2010).*

Yang, Jisoo, and Kang G. Shin. "Using hypervisor to provide data secrecy for user applications on a per-page basis." Proceedings of the fourth ACM SIGPLAN/SIGOPS international conference on Virtual execution environments. ACM, 2008. (Year: 2008).*

International Search Report and Written Opinion in International Application No. PCT/US2016/033863, dated Aug. 24, 2016, 10 pages.

Dell Secureworks, "Point-of-Sale Malware Threats," May 30, 2013; 13 pages.

Hizver, Jennia, et al., "An Introspection-Based Memory Scraper Attack Against Virtualized Point of Sale Systems," Feb. 28, 2011, Financial Cryptography and Data Security; 15 pages.

Kumar, Ajay, "Using Whitelisting Technology to Defend Against POS Malware," Apr. 2014; 2 pages.

* cited by examiner

PROTECTION OF SENSITIVE DATA

TECHNICAL FIELD

This disclosure relates in general to the field of information security, and more particularly, to the protection of sensitive data.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
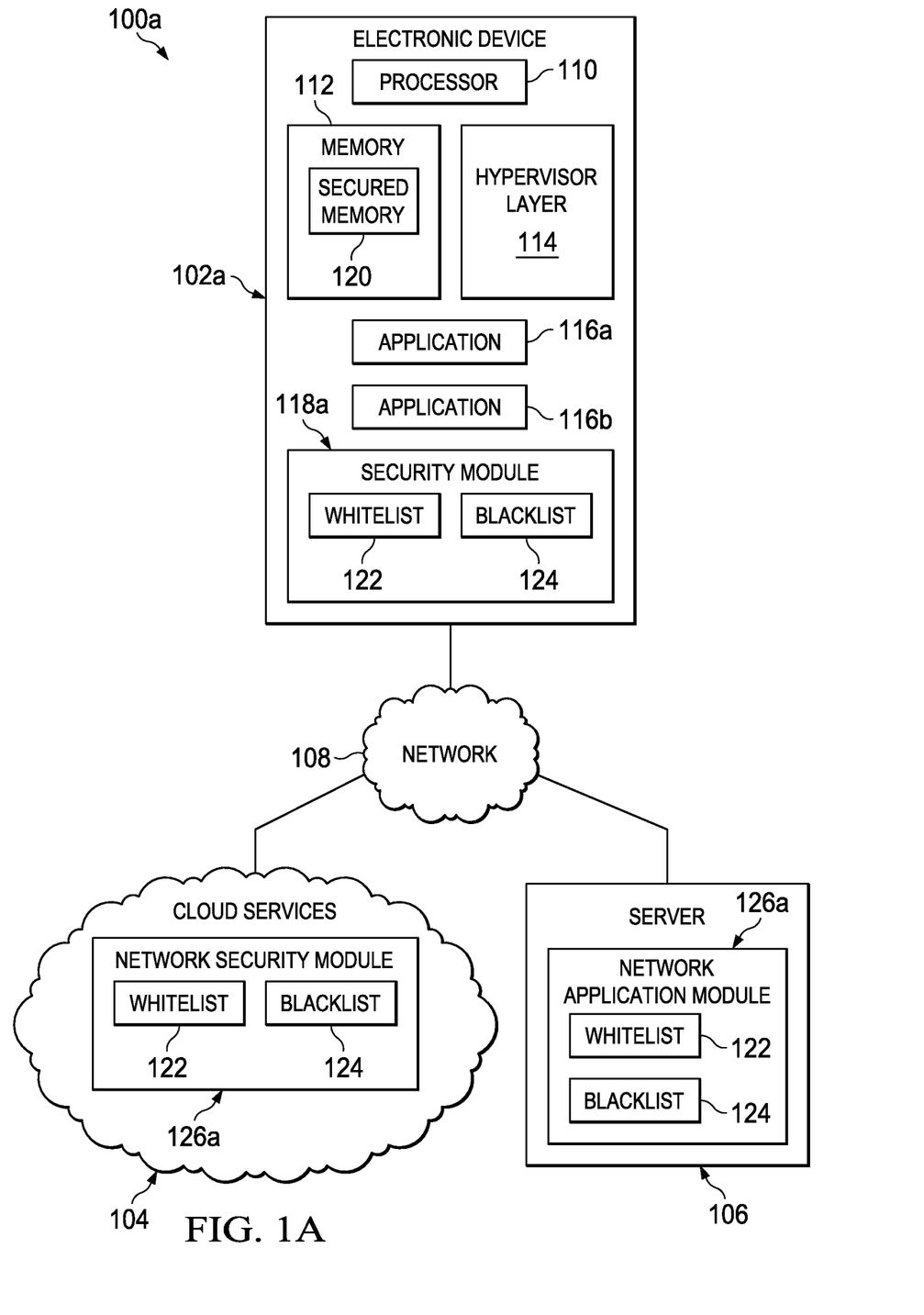
FIG. 1A is a simplified block diagram of a communication system for the protection of sensitive data, in accordance with an embodiment of the present disclosure.

FIG. 1A is a simplified block diagram of a communication system 100a for the protection of sensitive data, in accordance with an embodiment of the present disclosure. As illustrated in FIG. 1A, an embodiment of communication system 100a can include an electronic device 102a, cloud services 104, and a server 106. Electronic device 102a can include a processor 110, memory 112, a hypervisor layer 114, one or more applications 116a and 116b, and a security module 118a. Memory 112 can include secured memory 120. Security module 118a can include a whitelist 122 and a blacklist 124. Cloud services 104 and server 106 can each include a network security module 126a. Network security module 126a can include whitelist 122 and blacklist 124. Electronic device 102a, cloud services 104, and server 106 may be in communication using network 108. Hypervisor layer 114 is a hypervisor layer or level below the operating system level of electronic device 102a.

Communication system 100a can be configured to monitor read attempts to secured memory 120 at hypervisor layer 114. When application 116a (or 116b) tries to read information in secured memory 120, security module 118a can determine if application 116a (or 116b) is trusted. For example, security module 118a can use whitelist 122 to determine if application 116a (or 116b) is trusted and blacklist 124 to determine if application 116a (or 116b) is untrusted. In an example, security module 118a can communicate with network security module 126a to determine if application 116a (or 116b) is trusted or untrusted. For example, whitelist 122 and blacklist 124 may be located in network security module 126a. If application 116a (or 116b) is untrusted, then the read request can be denied.

Figure 1B:
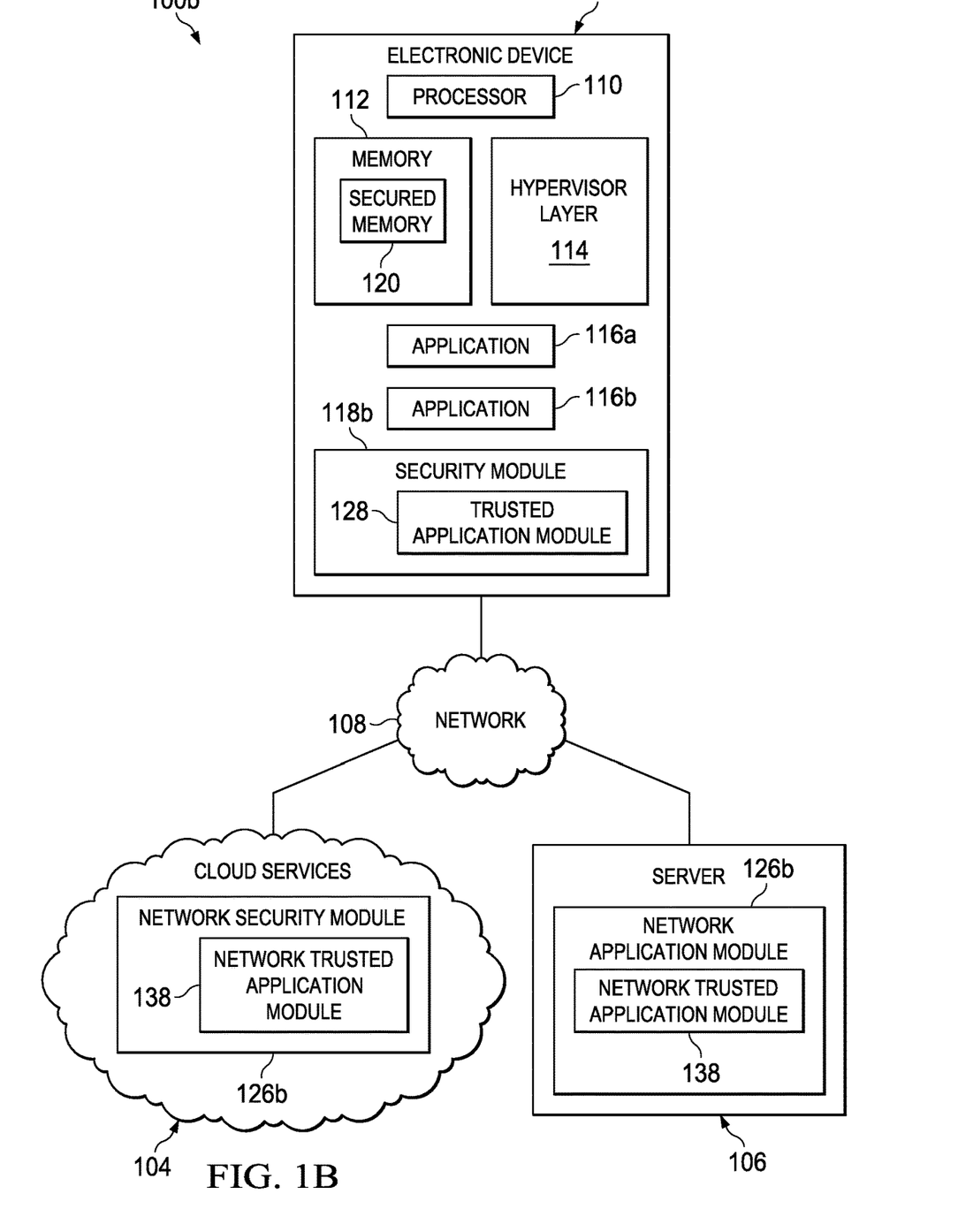
FIG. 1B is a simplified block diagram of a communication system for the protection of sensitive data, in accordance with an embodiment of the present disclosure.

Turning to FIG. 1B, FIG. 1B is a simplified block diagram of a communication system 100b for the protection of sensitive data, in accordance with an embodiment of the present disclosure. As illustrated in FIG. 1B, an embodiment of communication system 100b can include an electronic device 102b, cloud services 104, and server 106. Electronic device 102b can include processor 110, memory 112, hypervisor layer 114, one or more applications 116a and 116b, and a security module 118b. Security module 118b can include a trusted application module 128. Cloud services 104 and server 106 can each include a network security module 126b. Network security module 126b can include a network trusted application module 138. Electronic device 102b, cloud services 104 and server 106 may be in communication using network 108.

Communication system 100b can be configured to monitor read attempts to secured memory 120 at hypervisor layer 114. When application 116a (or 116b) tries to read information in secured memory 120, security module 118b can determine if application 116a (or 116b) is trusted. For example, security module 118b can use trusted application module 128 to determine if application 116a (or 116b) is trusted or untrusted. Security module 118b can be configured to use one or more algorithms or other means to determine if application 116a (or 116b) is trusted or untrusted. In an example, security module 118b can communicate with network security module 126b to determine if application 116a (or 116b) is trusted or untrusted. For example, network security module 126b may use network trusted application module 138 to determine if application 116a (or 116b) is trusted or untrusted. Network security module 126a and 126b can be configured to use one or more algorithms or other means to determine if application 116a (or 116b) is trusted or untrusted. If application 116a (or 116b) is not trusted, then the read request can be denied.

Figure 1C:
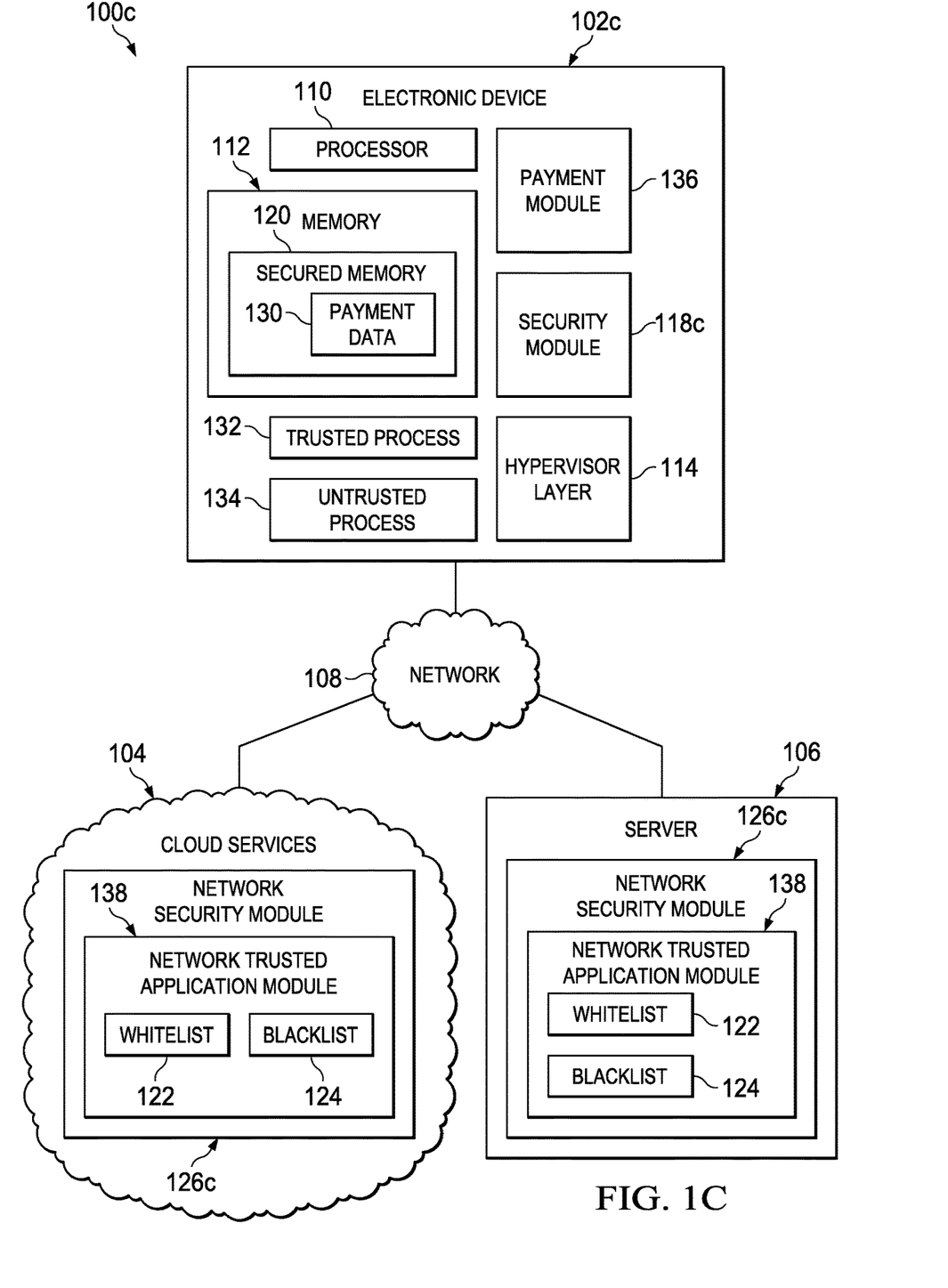
FIG. 1C is a simplified block diagram of a communication system for the protection of sensitive data, in accordance with an embodiment of the present disclosure.

Turning to FIG. 1C, FIG. 1C is a simplified block diagram of a communication system 100c for the protection of sensitive data, in accordance with an embodiment of the present disclosure. As illustrated in FIG. 1C, an embodiment of communication system 100c can include an electronic device 102c, a cloud services 104, and server 106. Electronic device 102c can include processor 110, memory 112, hypervisor layer 114, a security module 118c, one or more trusted processes 132, one or more untrusted processes 134, and a payment module 136. Memory 112 can include secured memory 120. Secured memory 120 can include payment data 130. Cloud services 104 and server 106 can each include a network security module 126c. Network security module 126c can include network trusted application module 138. Network trusted application module 138 can include whitelist 122 and blacklist 124. Electronic device 102c, cloud services 104 and server 106 may be in communication using network 108.

Communication system 100c can be configured to monitor read attempts to secured memory 120 at hypervisor layer 114. For example, payment module 136 may receive PoS payment data such as credit card information. The PoS payment data can be stored in payment data 130 in secured memory 120. At hypervisor layer 114, security module 118c can communicate with hypervisor layer 114 and allow trusted process 132 to access payment data 130 in secured memory 120 and deny untrusted process 134 access to payment data 130 in secured memory 120. In an example, security module 118c can communicate with network security module 126c to determine if an application or process is trusted or untrusted. If the application or process is not trusted, then the read request can be denied. In an example, only if the application or process is trusted, then access to secured memory 120 is allowed. Payment module 136 can include a payment terminal, a point of sale terminal, or some other means that can interface with payment cards or other methods of facilitating electronic funds transfers.

Elements of FIGS. 1A-1C may be coupled to one another through one or more interfaces employing any suitable connections (wired or wireless), which provide viable pathways for network (e.g., network 108, etc.) communications. Additionally, any one or more of these elements of FIGS. 1A-1CB may be combined or removed from the architecture based on particular configuration needs. Communication systems 100a-100c may include a configuration capable of transmission control protocol/Internet protocol (TCP/IP) communications for the transmission or reception of packets in a network. Communication systems 100a-100c may also operate in conjunction with a user datagram protocol/IP (UDP/IP) or any other suitable protocol where appropriate and based on particular needs.

For purposes of illustrating certain example techniques of communication systems 100a-100c, it is important to understand the communications that may be traversing the network environment. The following foundational information may be viewed as a basis from which the present disclosure may be properly explained.

Modern point-of-sale (PoS) devices are quite complex and can perform many different tasks. Apart from simply being a cash register, they may include inventory management, warehousing, financial information management, etc. and many PoS devices engage in networking and cloud computing. This brings a number of information security risks to the POS infrastructure.

One the major problems with current PoS devices is bank card information leak. Standards require PoS data to be encrypted when stored on a hard drive or transmitted through the network but the data is often completely unprotected in the volatile memory, such as random access memory (RAM), of the PoS device. Furthermore the data might remain in a RAM for some time after card data processing is finished. This gives malicious operators an opportunity to steal the data by searching through the RAM of PoS device.

PoS RAM scrapers are malicious programs that search memory of PoS systems for bank card information. The PoS RAM scrappers can steal payment data, such as credit data from the RAM of PoS systems. This payment data is decrypted in the PoS's RAM for processing, and the RAM is where the scraper strikes. Using regular expression searches, they harvest the clear-text payment data and send that information to home servers.

A communication system for the protection of PoS data, as outlined in FIGS. 1A-1C, can resolve these issues (and others). Communication systems 100a-100c may be configured to monitor pages that have confidential information to monitor 'READ' attempts to the pages. For example, when confidential information is read/accessed by an untrusted processes/modules, the system can allow or deny the read/access as well as detect the process responsible for read/access. In a specific example, permissions to read or access to all the pages with confidential information is set to a deny permission. When an application or process tries to read the pages with confidential information, a violation occurs and an analysis of where the read request originated can be performed. Once the application or process that originated the read request is determined, the system can determine if the application or process is trusted. If the application or process is not trusted, then the read request can be denied.

Turning to the infrastructure of FIGS. 1A-1C, communication systems 100a-100c in accordance with an example embodiment is shown. Generally, communication systems 100a-100c can be implemented in any type or topology of networks. Network 108 represents a series of points or nodes of interconnected communication paths for receiving and transmitting packets of information that propagate through communication systems 100a-100c. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100a-100c, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a-100c. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-102c, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a-100c, each of electronic devices 102a-102c, cloud services 104, and server 106 can include memory elements for storing information to be used in the operations outlined herein. Each of electronic devices 102a-102c, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a-100c could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a-100c, such as electronic devices 102a-102c, cloud services 104, and server 106, may include software modules (e.g., security modules 118a-118c, network security module 126, trusted application module 128, and payment module 136) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-102c, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Each of electronic devices 102a-102c can be a network element and include, for example, desktop computers, laptop computers, mobile devices, personal digital assistants, smartphones, tablets, or other similar devices. Cloud services 104 is configured to provide cloud services to electronic devices 102a-102c. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100a-100c via some network (e.g., network 108). The term 'server' is inclusive of devices used to serve the requests of clients and/or perform some computational task on behalf of clients within communication systems 100a-100c. Although security module 118a is represented in FIG. 1A as being located in electronic device 102a, security module 118b is represented in FIG. 1B as being located in electronic device 102b, and security module 118c is represented in FIG. 1C as being located in electronic device 102c, this is for illustrative purposes only. Security modules 118a-118c could be combined or separated in any suitable configuration. Furthermore, security modules 118a-118c could be integrated with or distributed in another network accessible by electronic devices 102a-102c such as cloud services 104 or server 106.

Figure 2:
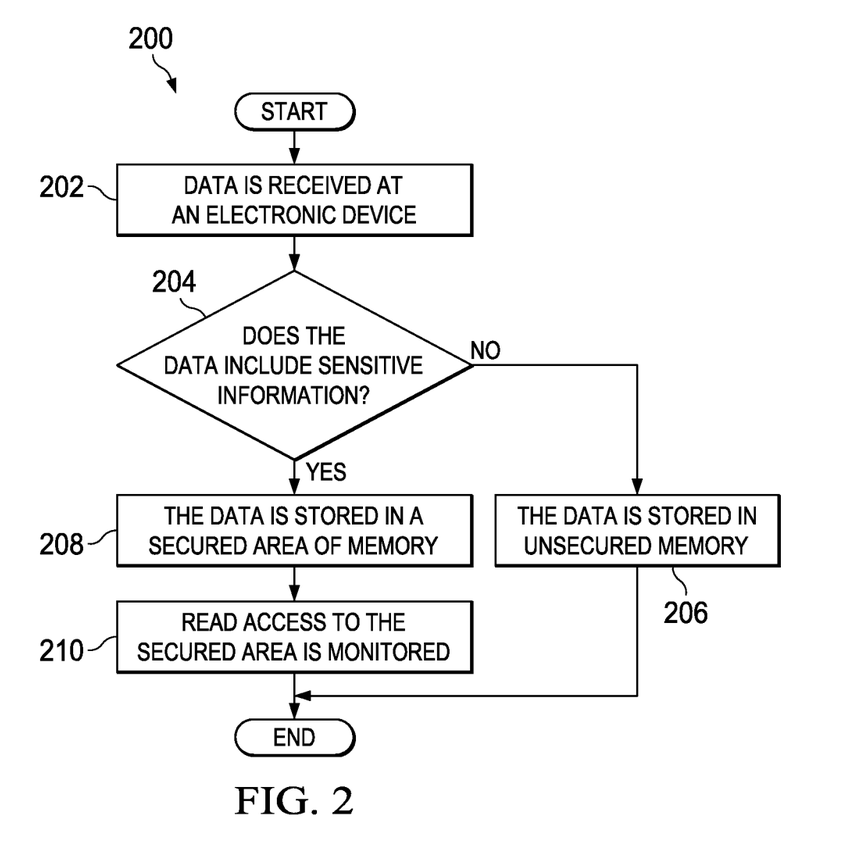
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with the protection of sensitive data, in accordance with an embodiment. In an embodiment, one or more operations of flow 200 may be performed by security module 118a-118c and network security module 126. At 202, data is received at an electronic device. At 204, the system determines if the data includes sensitive information. If the data does not include sensitive information, then the data is stored in unsecured memory, as in 206. If the data does include sensitive information, then the data is stored in a secured area of memory, as in 208. At 210, read access to the secured area is monitored.

Figure 3:
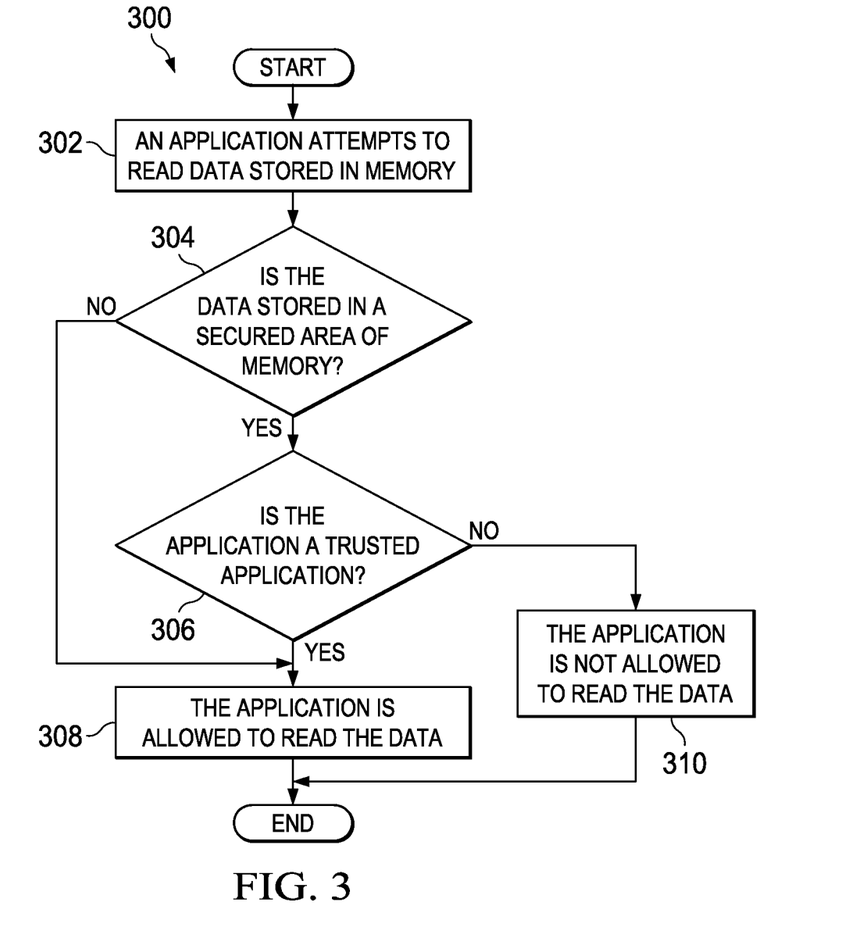
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with the protection of sensitive data, in accordance with an embodiment. In an embodiment, one or more operations of flow 300 may be performed by security module 118a-118c and network security module 126. At, 302, an application attempts to read data stored in memory. At 304, the system determines if the data is stored in a secured area of memory. If the data is not stored in a secured area of memory, then the application is allowed to read the data, as in 308. If the data is stored in a secured area of memory, then the system determines if the application is a trusted application, as in 306. If the application is a trusted application, then the application is allowed to read the data, as in 308. If the application is not a trusted application, then the application is not allowed to read the data, as in 310.

Figure 4:
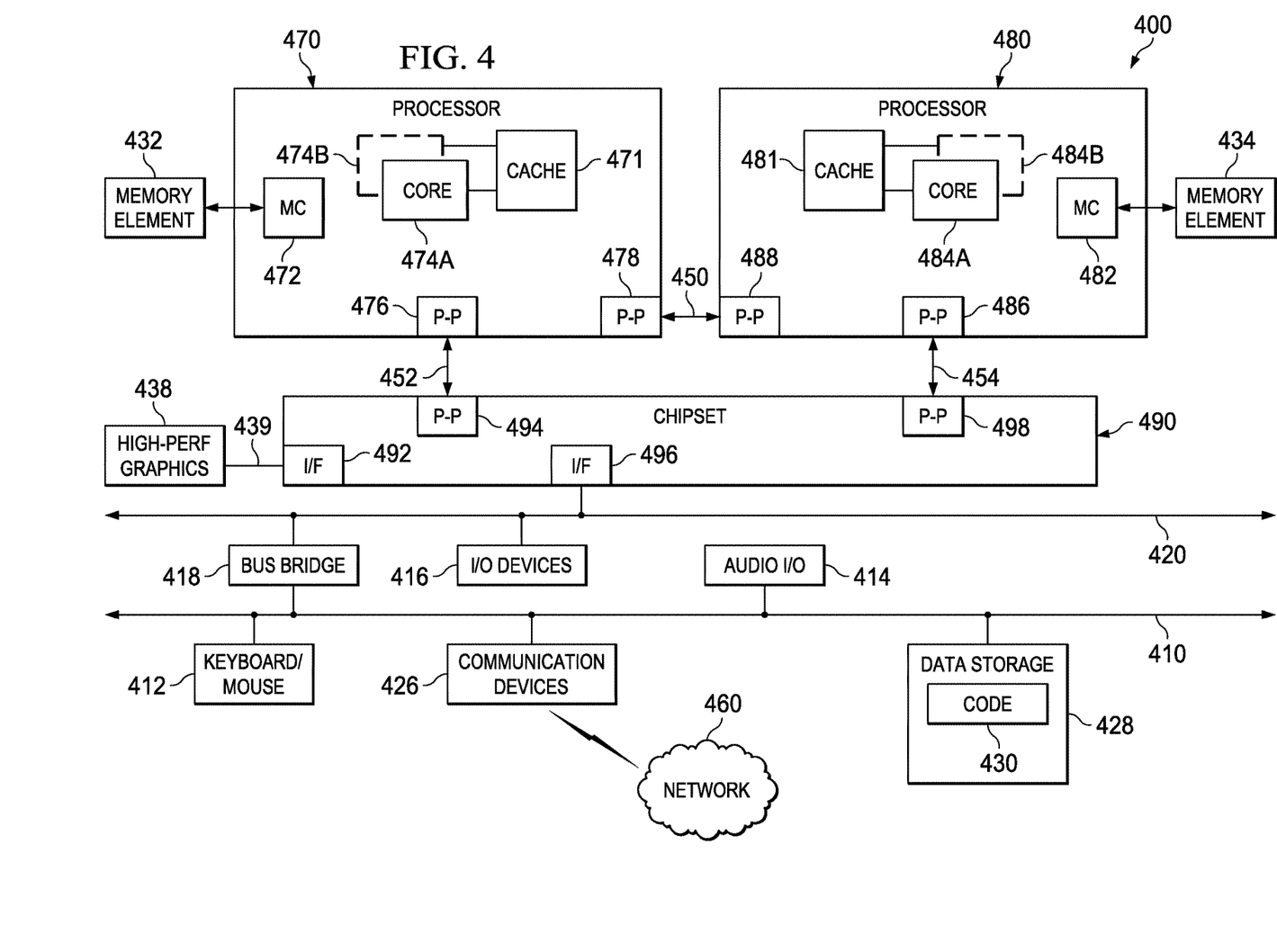
FIG. 4 is a block diagram illustrating an example computing system that is arranged in a point-to-point configuration in accordance with an embodiment.

FIG. 4 illustrates a computing system 400 that is arranged in a point-to-point (PtP) configuration according to an embodiment. In particular, FIG. 4 shows a system where processors, memory, and input/output devices are interconnected by a number of point-to-point interfaces. Generally, one or more of the network elements of communication system 10 may be configured in the same or similar manner as computing system 400.

As illustrated in FIG. 4, system 400 may include several processors, of which only two, processors 470 and 480, are shown for clarity. While two processors 470 and 480 are shown, it is to be understood that an embodiment of system 400 may also include only one such processor. Processors 470 and 480 may each include a set of cores (i.e., processor cores 474A and 474B and processor cores 484A and 484B) to execute multiple threads of a program. The cores may be configured to execute instruction code in a manner similar to that discussed above with reference to FIGS. 1-3. Each processor 470, 480 may include at least one shared cache 471, 481. Shared caches 471, 481 may store data (e.g., instructions) that are utilized by one or more components of processors 470, 480, such as processor cores 474 and 484.

Processors 470 and 480 may also each include integrated memory controller logic (MC) 472 and 482 to communicate with memory elements 432 and 434. Memory elements 432 and/or 434 may store various data used by processors 470 and 480. In alternative embodiments, memory controller logic 472 and 482 may be discreet logic separate from processors 470 and 480.

Processors 470 and 480 may be any type of processor and may exchange data via a point-to-point (PtP) interface 450 using point-to-point interface circuits 478 and 488, respectively. Processors 470 and 480 may each exchange data with a chipset 490 via individual point-to-point interfaces 452 and 454 using point-to-point interface circuits 476, 486, 494, and 498. Chipset 490 may also exchange data with a high-performance graphics circuit 438 via a high-performance graphics interface 439, using an interface circuit 492, which could be a PtP interface circuit. In alternative embodiments, any or all of the PtP links illustrated in FIG. 4 could be implemented as a multi-drop bus rather than a PtP link.

Chipset 490 may be in communication with a bus 420 via an interface circuit 496. Bus 420 may have one or more devices that communicate over it, such as a bus bridge 418 and I/O devices 416. Via a bus 410, bus bridge 418 may be in communication with other devices such as a keyboard/mouse 412 (or other input devices such as a touch screen, trackball, etc.), communication devices 426 (such as modems, network interface devices, or other types of communication devices that may communicate through a computer network 460), audio I/O devices 414, and/or a data storage device 428. Data storage device 428 may store code 430, which may be executed by processors 470 and/or 480. In alternative embodiments, any portions of the bus architectures could be implemented with one or more PtP links.

The computer system depicted in FIG. 4 is a schematic illustration of an embodiment of a computing system that may be utilized to implement various embodiments discussed herein. It will be appreciated that various components of the system depicted in FIG. 4 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 5:
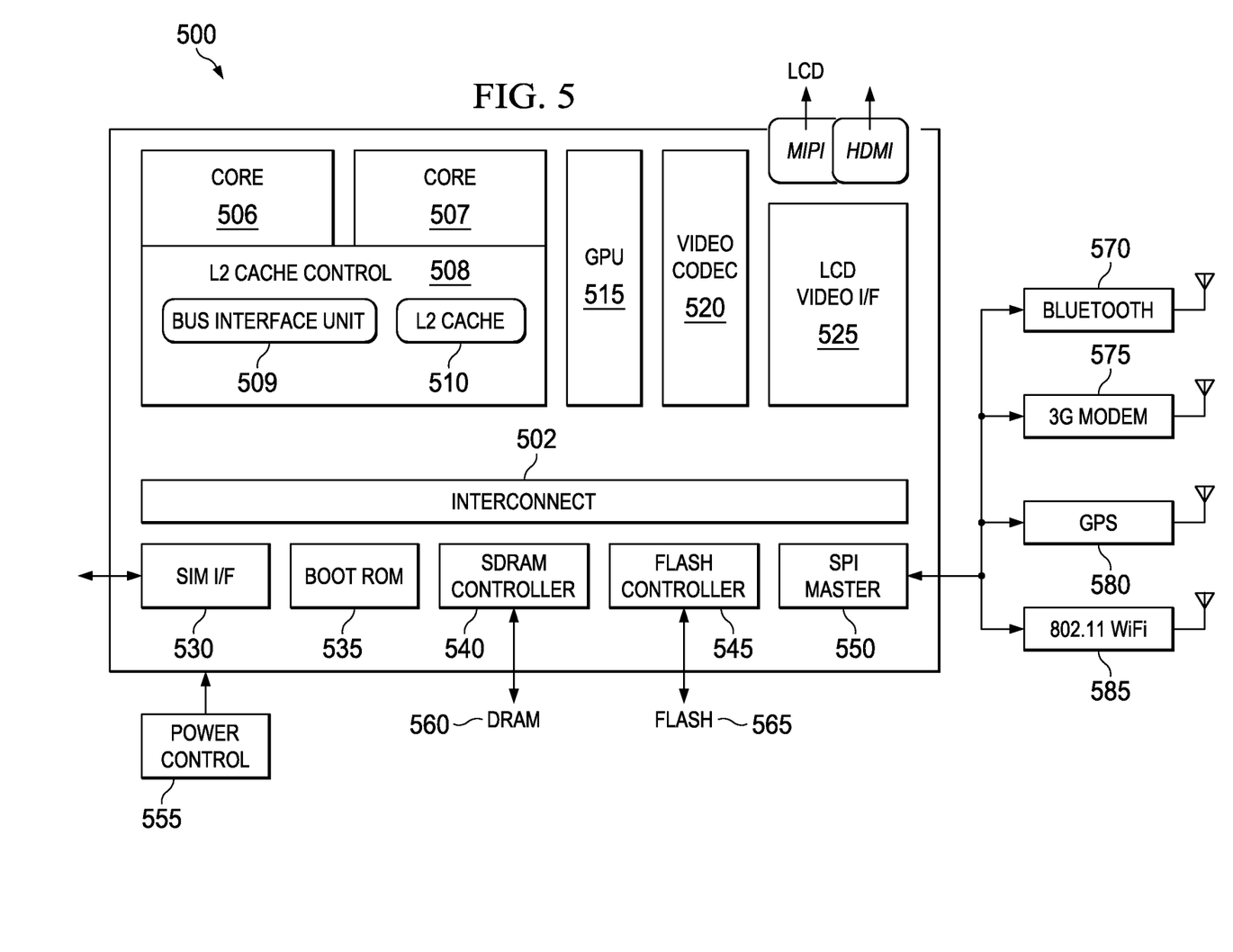
FIG. 5 is a simplified block diagram associated with an example ARM ecosystem system on chip (SOC) of the present disclosure.

Turning to FIG. 5, FIG. 5 is a simplified block diagram associated with an example ARM ecosystem SOC 500 of the present disclosure. At least one example implementation of the present disclosure can include the protection of sensitive data features discussed herein and an ARM component. For example, the example of FIG. 5 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 5, ARM ecosystem SOC 500 may include multiple cores 506-507, an L2 cache control 508, a bus interface unit 509, an L2 cache 510, a graphics processing unit (GPU) 515, an interconnect 502, a video codec 520, and a liquid crystal display (LCD) I/F 525, which may be associated with mobile industry processor interface (MIPI)/high-definition multimedia interface (HDMI) links that couple to an LCD.

ARM ecosystem SOC 500 may also include a subscriber identity module (SIM) I/F 530, a boot read-only memory (ROM) 535, a synchronous dynamic random access memory (SDRAM) controller 540, a flash controller 545, a serial peripheral interface (SPI) master 550, a suitable power control 555, a dynamic RAM (DRAM) 560, and flash 565. In addition, one or more example embodiments include one or more communication capabilities, interfaces, and features such as instances of Bluetooth™ 570, a 3G modem 575, a global positioning system (GPS) 580, and an 802.11 Wi-Fi 585.

In operation, the example of FIG. 5 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 6:
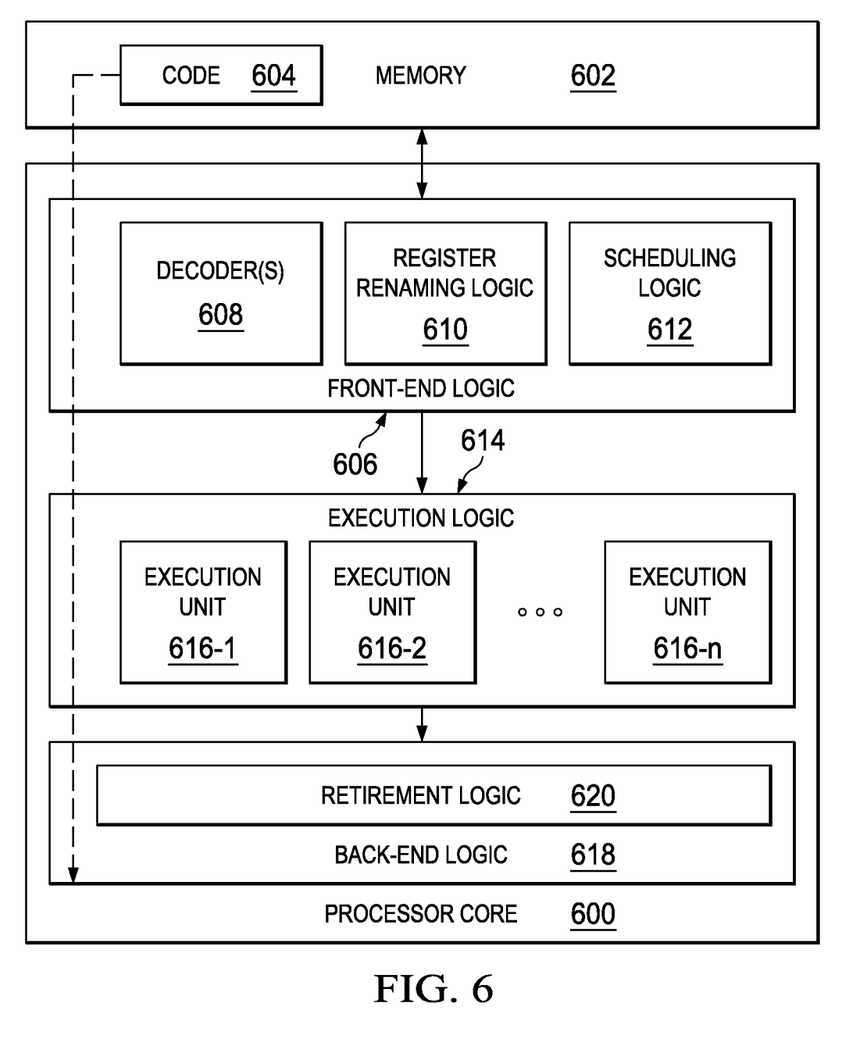
FIG. 6 is a block diagram illustrating an example processor core in accordance with an embodiment.

FIG. 6 illustrates a processor core 600 according to an embodiment. Processor core 600 may be the core for any type of processor, such as a micro-processor, an embedded processor, a digital signal processor (DSP), a network processor, or other device to execute code. Although only one processor core 600 is illustrated in FIG. 6, a processor may alternatively include more than one of the processor core 600 illustrated in FIG. 6. For example, processor core 600 represents one example embodiment of processors cores 474a, 474b, 484a, and 484b shown and described with reference to processors 470 and 480 of FIG. 4. Processor core 600 may be a single-threaded core or, for at least one embodiment, processor core 600 may be multithreaded in that it may include more than one hardware thread context (or "logical processor") per core.

FIG. 6 also illustrates a memory 602 coupled to processor core 600 in accordance with an embodiment. Memory 602 may be any of a wide variety of memories (including various layers of memory hierarchy) as are known or otherwise available to those of skill in the art. Memory 602 may include code 604, which may be one or more instructions, to be executed by processor core 600. Processor core 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor core 600 can also include execution logic 614 having a set of execution units 616-1 through 616-N. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor core 600 allows out of order execution but requires in order retirement of instructions. Retirement logic 620 may take a variety of known forms (e.g., re-order buffers or the like). In this manner, processor core 600 is transformed during execution of code 604, at least in terms of the output generated by the decoder, hardware registers and tables utilized by register renaming logic 610, and any registers (not shown) modified by execution logic 614.

Although not illustrated in FIG. 6, a processor may include other elements on a chip with processor core 600, at least some of which were shown and described herein with reference to FIG. 6. For example, as shown in FIG. 6, a processor may include memory control logic along with processor core 600. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a-100c and their teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations in the preceding flow diagrams (i.e., FIGS. 2 and 3) illustrate only some of the possible correlating scenarios and patterns that may be executed by, or within, communication systems 100a-100c. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a-100c in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a-100c have been illustrated with reference to particular elements and operations that facilitate the communication process, these elements and operations may be replaced by any suitable architecture, protocols, and/or processes that achieve the intended functionality of communication systems 100a-100c.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor, cause the at least one processor to monitor, by a security module, access to data in a secured area of memory at a hypervisor level, receive a request from a process to the data in the secured area, and deny the request if the process is not a trusted process.

In Example C2, the subject matter of Example C1 can optionally include where the one or more instructions that when executed by the at least one processor, further cause the at least one processor to set a permission to read the data in the secured area of memory to a deny permission.

In Example C3, the subject matter of any one of Examples C1-C2 can optionally include where the one or more instructions that when executed by the at least one processor, further cause the at least one processor to determine if the process is a trusted process.

In Example C4, the subject matter of any one of Examples C1-C3 can optionally include where the one or more instructions that when executed by the at least one processor, further cause the at least one processor to allow the request if the process is a trusted process or is included in a whitelist.

In Example C5, the subject matter of any one of Examples C1-C4 can optionally include where the electronic device is a point of sale device.

In Example A1, an electronic device can include a security module, where the security module is configured to monitor access to data in a secured area of memory at a hypervisor level, receive a request from a process to the data in the secured area, and deny the request if the process is not a trusted process.

In Example, A2, the subject matter of Example A1 can optionally include where the security module is further configured to set a permission to read the data in the secured area of memory to a deny permission.

In Example A3, the subject matter of any one of Examples A1-A2 can optionally include where the security module is further configured to determine if the process is a trusted process.

In Example A4, the subject matter of any one of Examples A1-A3 can optionally include where the security module is further configured to allow the request if the process is a trusted process or is included in a whitelist.

In Example A5, the subject matter of any one of Examples A1-A4 can optionally include where the electronic device is a point of sale device.

Example M1 is a method including monitoring access to data in a secured area of memory at a hypervisor level, receiving a request from a process to the data in the secured area, and denying the request if the process is not a trusted process.

In Example M2, the subject matter of Example M1 can optionally include setting a permission to read the data in the secured area of memory to a deny permission.

In Example M3, the subject matter of any one of the Examples M1-M2 can optionally include determining if the process is a trusted process.

In Example M4, the subject matter of any one of the Examples M1-M3 can optionally include allowing the request if the process is a trusted process or is included in a whitelist.

In Example M5, the subject matter of any one of the Examples M1-M4 can optionally include where the electronic device is a point of sale device.

Example S1 is a system for protecting data, the system including a security module configured to monitor access to data in a secured area of memory at a hypervisor level, receive a request from a process to the data in the secured area, and deny the request if the process is not a trusted process.

In Example S2, the subject matter of Example S1 can optionally include where the system is further configured to set a permission to read the data in the secured area of memory to a deny permission.

In Example S3, the subject matter of any one of Examples S1-S2 can optionally include where the system is further configured to determine if the process is a trusted process.

In Example S4, the subject matter of any one of Examples S1-S3 can optionally include where the system is further configured to allow the request if the process is a trusted process or is included in a whitelist.

In Example S5, the subject matter of any one of Examples S1-S4 can optionally include where the electronic device is a point of sale device.

Example X1 is a machine-readable storage medium including machine-readable instructions to implement a method or realize an apparatus as in any one of the Examples A1-A5, or M1-M5. Example Y1 is an apparatus comprising means for performing of any of the Example methods M1-M5. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor of an electronic device, cause the at least one processor to:
   receive data via a network;
   determine if the data includes sensitive information;
   store the data in a secured area of memory if the data includes sensitive information;
   monitor, by a security module, access to the data in the secured area of memory, wherein the secured area of memory is at a hypervisor level;
   receive a request from an application to access the data in the secured area;
   determine if the application is a trusted application; and
   allow the request if the application is a trusted application; or
   deny the request if the application is not a trusted application; and
   wherein the one or more instructions further cause the at least one processor to store the data in a non-secured area of memory if the data does not include sensitive information.

2. The at least one non-transitory machine readable medium of claim 1, further comprising one or more instructions that when executed by the at least one processor, further cause the at least one processor to:
   set a permission to read the data in the secured area of memory to a deny permission.

3. The at least one non-transitory machine readable medium of claim 1, further comprising one or more instructions that when executed by the at least one processor, further cause the at least one processor to:
   allow the request if the application is included in a whitelist.

4. The at least one non-transitory machine readable medium of claim 1, wherein the electronic device is a point of sale device.

5. An electronic device comprising:
   memory; and
   a hardware processor configured to execute a security module configured to:
   receive data via a network;
   determine if the data includes sensitive information;
   store the data in a secured area of memory if the data includes sensitive information;

monitor access to data in a secured area of the memory, wherein the secured area of memory is at a hypervisor level;
receive a request from an application to access the data in the secured area;
determine if the application is a trusted application; and
allow the request if the application is a trusted application; or
deny the request if the application is not a trusted application; and
wherein the hardware processor is further configured to store the data in a non-secured area of memory if the data does not include sensitive information.

6. The apparatus of claim 5, wherein the security module is further configured to:
set a permission to read the data in the secured area of the memory to a deny permission.

7. The apparatus of claim 5 wherein the security module is further configured to:
allow the request if the application is included in a whitelist.

8. The apparatus of claim 5, wherein the electronic device is a point of sale device.

9. A method comprising:
receiving, with a hardware processor of an electronic device, data via a network;
determining, with the hardware processor, if the data includes sensitive information;
storing, with the hardware processor, the data in a secured area of memory if the data includes sensitive information;
monitoring, with the hardware processor, access to data in a secured area of memory, wherein the secured area of memory is at a hypervisor level;
receiving, with the hardware processor, a request from an application to access the data in the secured area;
determining, with the hardware processor, if the application is a trusted application; and
allowing, with the hardware processor, the request if the application is a trusted application; or
denying, with the hardware processor, the request if the application is not a trusted application; and
wherein the hardware processor is further configured to store the data in a non-secured area of memory if the data does not include sensitive information.

10. The method of claim 9, further comprising:
setting a permission to read the data in the secured area of memory to a deny permission.

11. The method of claim 9, further comprising:
allowing, with the hardware processor, the request if the application is included in a whitelist.

12. The method of claim 9, wherein the electronic device is a point of sale device.

13. A system for protecting data, the system comprising:
memory in an electronic device;
a hardware processor in the electronic device, wherein the processor is configured to execute a security module configured to:
receive data via a network;
determine if the data includes sensitive information;
store the data in a secured area of memory if the data includes sensitive information;
monitor access to data in a secured area of the memory, wherein the secured area of memory is at a hypervisor level;
receive a request from an application to access the data in the secured area;
determine if the application is a trusted application; and
allow the request if the application is a trusted application; or
deny the request if the application is not a trusted application; and
wherein the hardware processor is further configured to store the data in a non-secured area of memory if the data does not include sensitive information.

14. The system of claim 13, wherein the system is further configured to:
set a permission to read the data in the secured area of the memory to a deny permission.

15. The system of claim 13, wherein the system is further configured to:
allow the request if the application is included in a whitelist.

16. The system of claim 13, wherein the electronic device is a point of sale device.

* * * * *

UNITED STATES PATENT AND TRADEMARK OFFICE
CERTIFICATE OF CORRECTION

PATENT NO. : 10,691,476 B2
APPLICATION NO. : 14/752888
DATED : June 23, 2020
INVENTOR(S) : Aditya Kapoor et al.

Page 1 of 1

It is certified that error appears in the above-identified patent and that said Letters Patent is hereby corrected as shown below:

In the Claims

In Column 12, Line 60, in Claim 5, delete "electronic device" and insert -- apparatus --, therefor.

Signed and Sealed this
Twenty-second Day of September, 2020

Andrei Iancu
*Director of the United States Patent and Trademark Office*